US011625755B1

(12) United States Patent
Shim et al.

(10) Patent No.: US 11,625,755 B1
(45) Date of Patent: *Apr. 11, 2023

(54) DETERMINING TARGETING INFORMATION BASED ON A PREDICTIVE TARGETING MODEL

(71) Applicant: PLACED, LLC, New York, NY (US)

(72) Inventors: David Shim, Seattle, WA (US); Elliott Waldron, Seattle, WA (US); Weilie Yi, Bellevue, WA (US); Michael Grebeck, Seattle, WA (US); Siddharth Rajaram, Seattle, WA (US); Jeremy Tryba, Seattle, WA (US); Nick Gerner, Seattle, WA (US); Andrea Eatherly, Seattle, WA (US)

(73) Assignee: FOURSQUARE LABS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,483

(22) Filed: Aug. 19, 2019

Related U.S. Application Data

(63) Continuation of application No. 14/488,074, filed on Sep. 16, 2014, now Pat. No. 10,423,983.

(51) Int. Cl.
*G06Q 30/00* (2012.01)
*G06Q 30/0251* (2023.01)
*H04W 4/029* (2018.01)
*H04W 4/021* (2018.01)

(52) U.S. Cl.
CPC ..... *G06Q 30/0267* (2013.01); *G06Q 30/0271* (2013.01); *H04W 4/021* (2013.01); *H04W 4/029* (2018.02)

(58) Field of Classification Search
None
See application file for complete search history.

(56) References Cited

U.S. PATENT DOCUMENTS

| 4,581,634 | A | 4/1986 | Williams |
| 4,975,690 | A | 12/1990 | Torres |
| 5,072,412 | A | 12/1991 | Henderson, Jr. et al. |
| 5,493,692 | A | 2/1996 | Theimer et al. |

(Continued)

FOREIGN PATENT DOCUMENTS

| CA | 2887596 A1 | 7/2015 |
| EP | 2051480 A1 | 4/2009 |

(Continued)

OTHER PUBLICATIONS

"A Whole New Story", URL: https://www.snap.com/en-US/news/, (2017), 13 pgs.

(Continued)

*Primary Examiner* — Meredith A Long

(57) ABSTRACT

A targeting system based on a predictive targeting model based on observed behavioral data including visit data, user profile and/or survey data, and geographic features associated with a geographic region. The predictive targeting model analyzes the observed behavioral data and the geographic features data to predict conversion rates for every cell in a square grid of predefined size on the geographic (Continued)

region. The conversion rate of a cell indicates a likelihood that any random user in that cell will perform a targeted behavior.

20 Claims, 10 Drawing Sheets

(56) References Cited

U.S. PATENT DOCUMENTS

| | | |
|---|---|---|
| 5,713,073 A | 1/1998 | Warsia |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkei. et al. |
| 6,154,764 A | 11/2000 | Nitta et al. |
| 6,167,435 A | 12/2000 | Druckenmiller |
| 6,204,840 B1 | 3/2001 | Peteiycky |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,485 B1 | 9/2002 | Anzil |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin |
| 6,658,095 B1 | 12/2003 | Yoakum |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz |
| 7,856,360 B2 | 12/2010 | Kramer et al. |
| 7,966,658 B2 | 6/2011 | Singh et al. |
| 8,001,204 B2 | 6/2011 | Burtner et al. |
| 8,010,685 B2 | 8/2011 | Singh et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,200,247 B1 | 6/2012 | Starenky et al. |
| 8,208,943 B2 | 6/2012 | Petersen |
| 8,214,443 B2 | 7/2012 | Hamburg |
| 8,220,034 B2 | 7/2012 | Hahn et al. |
| 8,229,458 B2 | 7/2012 | Busch |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,296,842 B2 | 10/2012 | Singh et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng |
| 8,423,409 B2 | 4/2013 | Rao |
| 8,471,914 B2 | 6/2013 | Sakiyama et al. |
| 8,472,935 B1 | 6/2013 | Fujisaki |
| 8,509,761 B2 | 8/2013 | Krinsky et al. |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |

(56) References Cited

U.S. PATENT DOCUMENTS

| | | |
|---|---|---|
| 8,588,942 B2 | 11/2013 | Agrawal |
| 8,594,680 B2 | 11/2013 | Ledlie et al. |
| 8,613,088 B2 | 12/2013 | Varghese et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegei |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,942,953 B2 | 1/2015 | Yuen et al. |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs |
| 9,143,382 B2 | 9/2015 | Bhogal et al. |
| 9,143,681 B2 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,256,832 B2 | 2/2016 | Shim et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Alien et al. |
| 9,628,950 B1 | 4/2017 | Noeth et al. |
| 9,710,821 B2 | 7/2017 | Heath |
| 9,854,219 B2 | 12/2017 | Sehn |
| 2002/0047868 A1 | 4/2002 | Miyazawa |
| 2002/0078456 A1 | 6/2002 | Hudson |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Wiilis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244633 A1 | 10/2007 | Phillips et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0021421 A1 | 1/2008 | Rasanen et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweller et al. |
| 2008/0120409 A1 | 5/2008 | Sun et al. |

(56) References Cited

U.S. PATENT DOCUMENTS

| | | |
|---|---|---|
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa. et al. |
| 2008/0318616 A1 | 12/2008 | Chipalkatti |
| 2009/0006191 A1 | 1/2009 | Arankalle et al. |
| 2009/0006565 A1 | 1/2009 | Veiusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089558 A1 | 4/2009 | Bradford et al. |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Frediund et al. |
| 2009/0163182 A1 | 6/2009 | Gatti et al. |
| 2009/0177299 A1 | 7/2009 | Van De Sluis et al. |
| 2009/0192900 A1 | 7/2009 | Collision |
| 2009/0199242 A1 | 8/2009 | Johnson et al. |
| 2009/0204354 A1 | 8/2009 | Davis et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0276235 A1 | 11/2009 | Benezra et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/2788738 | 11/2009 | Gopinath |
| 2009/0319607 A1 | 12/2009 | Belz et al. |
| 2009/0327073 A1 | 12/2009 | Li |
| 2010/0041378 A1 | 2/2010 | Aceves et al. |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0151882 A1* | 6/2010 | Gillies .................. G06Q 30/02 455/456.1 |
| 2010/0153144 A1 | 6/2010 | Miller et al. |
| 2010/0153216 A1* | 6/2010 | Liang ................ G06Q 30/0259 705/14.57 |
| 2010/0159944 A1 | 6/2010 | Pascal et al. |
| 2010/0161658 A1 | 6/2010 | Hamynen et al. |
| 2010/0161720 A1 | 6/2010 | Colligan et al. |
| 2010/0161831 A1 | 6/2010 | Haas et al. |
| 2010/0162149 A1 | 6/2010 | Sheieheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Peterson et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0211425 A1 | 8/2010 | Govindarajan |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0223346 A1 | 9/2010 | Dragt |
| 2010/0250109 A1 | 9/2010 | Johnston et al. |
| 2010/0257036 A1 | 10/2010 | Khojastepour et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0076653 A1 | 3/2011 | Culligan et al. |
| 2011/0083101 A1 | 4/2011 | Sharon et al. |
| 2011/0099046 A1 | 4/2011 | Weiss et al. |
| 2011/0099047 A1 | 4/2011 | Weiss et al. |
| 2011/0099048 A1 | 4/2011 | Weiss et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215903 A1 | 9/2011 | Yang et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0003371 A1 | 1/2012 | Kauffman et al. |
| 2012/0028659 A1 | 2/2012 | Whitney et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candeiore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |

(56) References Cited

U.S. PATENT DOCUMENTS

| | | |
|---|---|---|
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0246004 A1 | 9/2012 | Book et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0264446 A1 | 10/2012 | Xie et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormaid et al. |
| 2012/0307096 A1 | 12/2012 | Bray et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mceviliy et al. |
| 2013/0222323 A1 | 8/2013 | Mckenzie |
| 2013/0225202 A1 | 8/2013 | Shim et al. |
| 2013/0226857 A1 | 8/2013 | Shim et al. |
| 2013/0227476 A1 | 8/2013 | Frey |
| 2013/0232194 A1 | 9/2013 | Knapp et al. |
| 2013/0254227 A1 | 9/2013 | Shim et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Coiiins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegei |
| 2014/0143143 A1 | 5/2014 | Fasoli |
| 2014/0149519 A1 | 5/2014 | Redfern et al. |
| 2014/0155102 A1 | 6/2014 | Cooper |
| 2014/0156387 A1* | 6/2014 | Bruich ............... G06Q 30/0246 705/14.45 |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'Keefe et al. |
| 2014/0289833 A1 | 9/2014 | Briceno |
| 2014/0304038 A1* | 10/2014 | Milton ............... G06Q 30/0201 705/7.34 |
| 2014/0304212 A1 | 10/2014 | Shim et al. |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow |
| 2015/0095020 A1 | 4/2015 | Leydon |
| 2015/0096042 A1 | 4/2015 | Mizrachi |
| 2015/0116529 A1 | 4/2015 | Wu et al. |

(56) References Cited

U.S. PATENT DOCUMENTS

| | | | |
|---|---|---|---|
| 2015/0120453 A1* | 4/2015 | Lee | G06Q 30/0267 705/14.58 |
| 2015/0169827 A1 | 6/2015 | Laborde | |
| 2015/0172534 A1 | 6/2015 | Miyakawa et al. | |
| 2015/0178260 A1 | 6/2015 | Brunson | |
| 2015/0222814 A1 | 8/2015 | Li et al. | |
| 2015/0261917 A1 | 9/2015 | Smith | |
| 2015/0310490 A1* | 10/2015 | Meredith | H04W 4/021 705/14.58 |
| 2015/0312184 A1 | 10/2015 | Langholz et al. | |
| 2015/0350136 A1 | 12/2015 | Flynn, III et al. | |
| 2015/0365795 A1 | 12/2015 | Allen et al. | |
| 2015/0378502 A1 | 12/2015 | Hu et al. | |
| 2016/0006927 A1 | 1/2016 | Sehn | |
| 2016/0014063 A1 | 1/2016 | Hogeg et al. | |
| 2016/0048869 A1 | 2/2016 | Shim et al. | |
| 2016/0085773 A1 | 3/2016 | Chang et al. | |
| 2016/0085863 A1 | 3/2016 | Allen et al. | |
| 2016/0099901 A1 | 4/2016 | Allen et al. | |
| 2016/0157062 A1 | 6/2016 | Shim et al. | |
| 2016/0180887 A1 | 6/2016 | Sehn | |
| 2016/0182422 A1 | 6/2016 | Sehn et al. | |
| 2016/0182875 A1 | 6/2016 | Sehn | |
| 2016/0239248 A1 | 8/2016 | Sehn | |
| 2016/0277419 A1 | 9/2016 | Allen et al. | |
| 2016/0321708 A1 | 11/2016 | Sehn | |
| 2017/0006094 A1 | 1/2017 | Abou Mahmoud et al. | |
| 2017/0061308 A1 | 3/2017 | Chen et al. | |
| 2017/0287006 A1 | 10/2017 | Azmoodeh et al. | |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO2007092668 | 8/2007 |
| WO | WO-2009043020 A2 | 4/2009 |
| WO | WO-2011040821 A1 | 4/2011 |
| WO | WO-2011119407 A1 | 9/2011 |
| WO | WO2013008238 | 1/2013 |
| WO | WO-2013008238 | 1/2013 |
| WO | WO-2013045753 A1 | 4/2013 |
| WO | WO2014006129 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |

OTHER PUBLICATIONS

"Adding a watermark to your photos", eBay, URL: http://pages.ebay.com/help/sell/pictures.html, (accessed May 24, 2017), 4 pgs.

"BlogStomp", URL: http://stompsoftware.com/biogstomp, (accessed May 24, 2017), 12 pgs.

"Cup Magic Starbucks Holiday Red Cups come to life with AR app", URL: http://www.blastradius.com/work/cup-rnagic, (2016), 7 pgs.

"Daily App: InstaPlace (iOS/Android): Give Pictures a Sense of Place", TechPP, URL: http://techpp.com/2013/02/15/instapiace-app-review, (2013), 13 pgs.

"InstaPlace Photo App Tell The Whole Story", URL: https://youtu.be/uF _gFkg1hBM, (Nov. 8, 2013), 113 pgs.

"International Application Serial No. PCT/US2015/037251, International Search Report dated Sep. 29, 2015", 2 pgs.

"Introducing Snapchat Stories", URL: https://www.youtube.com/watch?v=88Cu3yN-LIM, (Oct. 3, 2013), 92 pgs.

"Macy's Believe-o-Magic", URL: https://www.youtube.com/watch?v=xvzRXy3J0Z0, (Nov. 7, 2011), 102 pgs.

"Macys introduces Augmented Reality Experience in Stores across Country as Part of its 2011 Believe Campaign", URL: https://www.businesswire.com/news/home/20111102006759/en/Macys-introduces-Augmented-Reality-Experience-Stores-Country, (Nov. 2, 2011), 6 pgs.

"Starbucks Cup Magic", URL: https://www.youtube.com/watch?v=RWwQXi9RG0w, (Nov. 8, 2011), 87 pgs.

"Starbucks Cup Magic for Valentine's Day", URL: https://www.youtube.com/watch?v=8nvqOzjg10w, (Feb. 6, 2012), 88 pgs.

"Starbucks Holiday Red Cups Come to Life, Signaling the Return of the Merriest Season", URL: http://www.businesswire.com/news/home/20111115005744/en/2479513/Starbucks-Holiday-Red-Cups-Life-Signaling-Return, (Nov. 15, 2011), 5 pgs.

Carthy, Roi, "Dear All Photo Apps: Mobil Just Won Filters", URL: https://techcrunch.com/2011/09/08/mobli-filters, (Sep. 8, 2011), 10 pgs.

Janthong, Isaranu, "Android App Review Thailand", URL: http://www.android-free-app-review.com/2013/01/instaplace-android-google-play-store.html, (Jan. 23, 2013), 9 pgs.

MacLeod, Duncan, "Macys Believe-o-Magic App", URL: http://theinspirationroom.com/daily/2011/macys-beiieve-o-magic-app, (Nov. 14, 2011), 10 pgs.

MacLeod, Duncan, "Starbucks Cup Magic Lets Merry", URL: http://theinspirationroom.com/daily/2011/starbucks-cup-magic, (Nov. 12, 2011), 8 pgs.

Notopoulos, Katie, "A Guide To The New Snapchat Filters And Big Fonts", URL: https://www.buzzfeed.com/katienotopoulos/a-guide-to-the-new-snapchat-filters-and -big-fonts?utm_term-bkQ9qVZWe#.nv58YXpkV, (Dec. 22, 2013), 13 pgs.

Panzarino, Matthew, "Snapchat Adds Filters, A Replay Function And For Whatever Reason, Time, Temperature And Speed Overlays", URL: https://techcrunch.com/2013/12/20/snapchat-adds-fiiters-new-font-and-for-some-reason-time-temperature-and-speed-overlays/, (Dec. 20, 2013), 12 pgs.

Tripathi, Rohit, "Watermark Images in PHP And Save File on Server", URL: http://code.rohitink.com/2012/12/28/watermark-images-in-php-and-save-fiie-on-server, (Dec. 28, 2012), 4 pgs.

* cited by examiner

DETERMINING TARGETING INFORMATION BASED ON A PREDICTIVE TARGETING MODEL

BACKGROUND

As the popularity of mobile devices has soared among consumers worldwide, the potential for targeting advertising content to users of mobile devices has also increased. For example, advertisers can obtain information about a current location a user of a mobile device and use that information along with information about nearby businesses to send targeted advertisements to the user's mobile device. By way of another example, advertisers can also deliver a specific advertisement to a mobile device of any user who comes within a certain radius of a point of interest.

BRIEF DESCRIPTION OF THE DRAWINGS

The details of embodiments of a system and method of determining targeting information based on a predictive targeting model (hereinafter the "targeting system") are set forth in the accompanying drawings and description below. Further embodiments and implementations and advantages of the disclosed targeting system will be apparent from the following detailed description, drawings and the claims.

DETAILED DESCRIPTION

Overview

Figure 1:
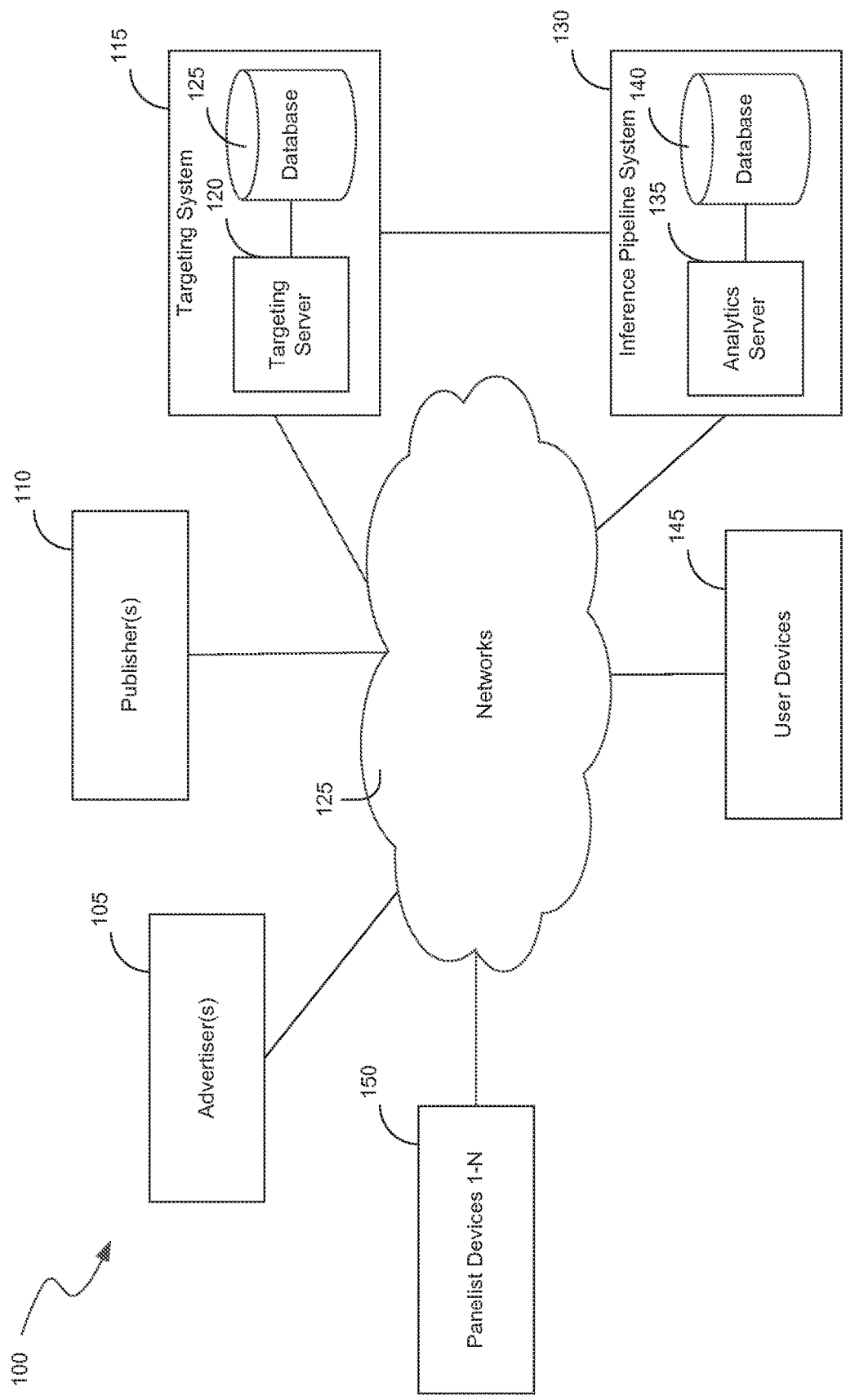
FIG. 1 is a block diagram illustrating an example environment in which the targeting system can operate.

Embodiments of the present disclosure include a system and method of determining targeting information based on a predictive targeting model (hereinafter the "targeting system"). The targeting model is based on observed behavioral data including visit data, user profile data and/or survey data, and geographic features associated with a geographic region. The targeting model predicts a conversion rate or likelihood that any random user in a small geographic area within the geographic region will perform a targeted behavior. The latitude and longitude coordinates of at least some of the geographic areas within the geographic region that are associated with high conversion rates are then provided by the targeting system as targeting information to advertisers, publishers and/or advertisement networks for use in targeting advertisements to customers in those locations. In some embodiments, instead of or in addition to the latitude and longitude coordinates of the locations with high conversion rates, the targeting system can identify one or more unique identifiers of the users in those locations with high conversion rates. Advertisers and publishers can then target against users with matching the unique identifiers, where those identifiers may lack any personally identifying information.

In some embodiments, location data collected from a panel of users ("panelists") can provide information about the places the panelists visited, and the timing and duration of such visits. Based on the place visit data, information about where a panelist's home location is, where the panelist's work location is, which grocery store the panelist visits regularly, and so on can be inferred. Moreover, user profile data can provide information about age, gender, ethnicity and/or other attributes of the panelists, while survey data can provide information about preferences of the panelists. The behavioral information can be projected onto a geographic region sub-divided into geographic units or cells, with each cell having a set of geographic features. The predictive targeting model can then take into account the behavioral information projected onto the cells to identify opportunities for advertisers and publishers for targeting advertisements.

For example, consider a brand (e.g., 24 Hour Fitness) that wants to know where its potential customers are in a geographic area (e.g., Washington State) in order to target advertisements against those locations. The targeting system can analyze the behavioral data of users to identify the places the users visited and geographic feature data associated with the geographic area. The targeting system can then use the targeting model to determine that users who go to 24 Hour Fitness ("24 Hour Fitness user group") are more likely to go to Jamba Juice compared to the overall population. Then the locations of Jamba Juice can be used for target ads related to 24 Hour Fitness because the users who live, work or visit those locations have a higher affinity for 24 Hour Fitness. Thus, rather than waiting until a user is in proximity to a 24 Hour Fitness to send an advertisement to the user's device, the targeting system enables a publisher or an advertiser to target advertisements against the locations that have a high affinity for 24 Hour Fitness regardless of whether the user is close to a 24 Hour Fitness or far away from it.

In some embodiments, the targeting model is not just based on which businesses users visited, but also a category of each business. For example, the targeting model can take into account not just Jamba Juice, but also other businesses in the beverage category that are visited by the 24 Hour Fitness user group. In some embodiments, the affinities are not necessarily with respect to businesses and/or businesses in the same category, but also demographics and/or other features of the geographic area. For example, in addition the 24 Hour Fitness user group having an affinity to Jamba Juice, the user group may also skew male. The targeting model can take into account demographics of the geographic area to identify cells that have a greater male population than female as being locations at which advertisements related to 24 Hour Fitness should be served. By way of another example, if an advertiser wants to target 13-17 year olds for a new animated feature, the targeting model would consider users that belong to the targeted age group and visits performed by the targeted age group users to identify locations against which advertisements related to the new animated feature can be targeted. In some embodiments, panelists can be asked survey questions such as "Do you like animated movies?" The targeting model would then consider users in the targeted age group that responded "yes" to the survey question and the visits performed by those users to identify locations that can be targeted against for advertisements related to the animated feature.

In some embodiments, a targeting model can also have a temporal component. For example, consider a targeted behavior of visiting a Walmart store in the morning. The targeting model would take into account place visits of users in the morning hours of 9 am to 12 noon to identify locations in a geographic region where users are likely to visit the Walmart store in the morning.

In some embodiments, the targeting model can be a look-alike model that enables advertisers to target users who look like their established or known customers. For example, the targeting model can be used to identify locations where customers who look like the people who go to 24 Hour Fitness and who are likely to sign up for a new membership are. To implement the look-alike model, the panelists can be segmented in two groups, the first group including panelists who have been to a gym in the last 30 days and the second group including panelists who have not. The behavior of the second group is considered by the targeting model as the first group of panelists likely already has a gym membership. The targeting model can then use the behavior of the second group of users to identify locations that have high affinity for gyms and/or users who are likely to sign up for a new gym membership.

Various embodiments and implementations of the targeting system will now be described. The following description provides specific details for a thorough understanding and an enabling description of these embodiments and implementations. One skilled in the art will understand, however, that the embodiments and implementations may be practiced without many of these details. Additionally, some well-known structures or functions may not be shown or described in detail, so as to avoid unnecessarily obscuring the relevant description of the various embodiments and implementations. The terminology used in the description presented below is intended to be interpreted in its broadest reasonable manner, even though it is being used in conjunction with a detailed description of certain specific embodiments and implementations of the targeting system.

Suitable System

The targeting system can be implemented in a suitable computing environment 100 illustrated in FIG. 1. Aspects, embodiments and implementations of the targeting system will be described in the general context of computer-executable instructions, such as routines executed by a general-purpose computer, a personal computer, a server, or other computing systems. The targeting system can also be embodied in a special-purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Embodiments of the targeting system can be implemented in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the targeting system described herein may be stored or distributed on tangible, non-transitory computer-readable media, including magnetic and optically readable and removable computer discs, stored in firmware in chips (e.g., EEPROM chips), an array of devices (e.g., Redundant Array of Independent Disks (RAID)), solid state memory devices (e.g., solid state drives (SSD), Universal Serial Bus (USB)), and/or the like. Alternatively, aspects of the targeting system may be distributed electronically over the Internet or over other networks (including wireless networks). Those skilled in the relevant art will recognize that portions of the targeting system may reside on one or more server computers, while corresponding portions reside on a client computer. Data structures and transmission of data particular to aspects of the targeting system are also encompassed within the scope of the present disclosure.

A targeting system 115 embodied in a targeting server 120 can operate in the example environment 100 illustrated in FIG. 1. The targeting server 120 can be coupled to one or more databases and/or database tables represented as a database 125. The environment 100 includes panelist devices 150, which can be devices of panelists of the targeting system that report location and other information to the targeting system 115 and/or an inference pipeline system 130. The inference pipeline system 130 is shown as including an analytics server 135 and a database 140. The panelist devices 150 can be any type of client device capable of measuring and reporting its location data. Typically, a client application is installed on a panelist device 150 to facilitate the location data collection and reporting. The inference pipeline system 130 and the data collection system are described in detail in related application Ser. Nos. 13/405,182 and 13/405,190, both filed on Feb. 12, 2012, which are expressly incorporated by reference herein.

The environment 100 can also include one or more advertisers 105 (or content providers in general) that wish to provide advertisements or other non-promotional content to user devices 145 of users for consumption. Typically, advertisers 105 engage publishers 110 to run advertisement ("ad") campaigns. The advertisers 105 and the publishers 110 can be computing systems in the form of one or more servers. User devices 145 can include any computing devices, such as but not limited to: a desktop computer, a laptop computer, a tablet, a mobile device or a feature phone. In some embodiments, user devices 145 can also include a television, a radio or any other electronic communication media through which content can be delivered to users for consumption. In some embodiments, the environment 100 can also include print media such as newspapers, publications, or the like. The user devices 145, via their network interfaces, connect to and/or communicate with networks 125, either directly or via wireless routers or cell towers. Networks 125 can include wired and wireless, private networks and public networks (e.g., the Internet). Network interfaces employ connection protocols such as direct connect, Ethernet, wireless connection such as IEEE 802.11a-n/ac, and the like to connect to networks 125. Some client devices may be equipped with transceiver circuitry to handle radio communications to wirelessly communicate with nearby cell towers or base stations using wireless mobile telephone standards, such as Global System for Mobile Communications (GSM), CDMA (Code Division Multiple Access), General Packet Radio Service (GPRS), and/or the like.

As illustrated, the publishers 110 can communicate with the targeting server 120 via the networks 125 to request targeting information for ad campaigns of advertisers 105. As described before, the targeting information can be latitude/longitude coordinates of locations having high conversion rates and/or one or more unique identifiers of users that are more likely to engage in a targeted behavior. The publishers 110 can then use the targeting information to target ads to user devices 145 of users.

Figure 2:
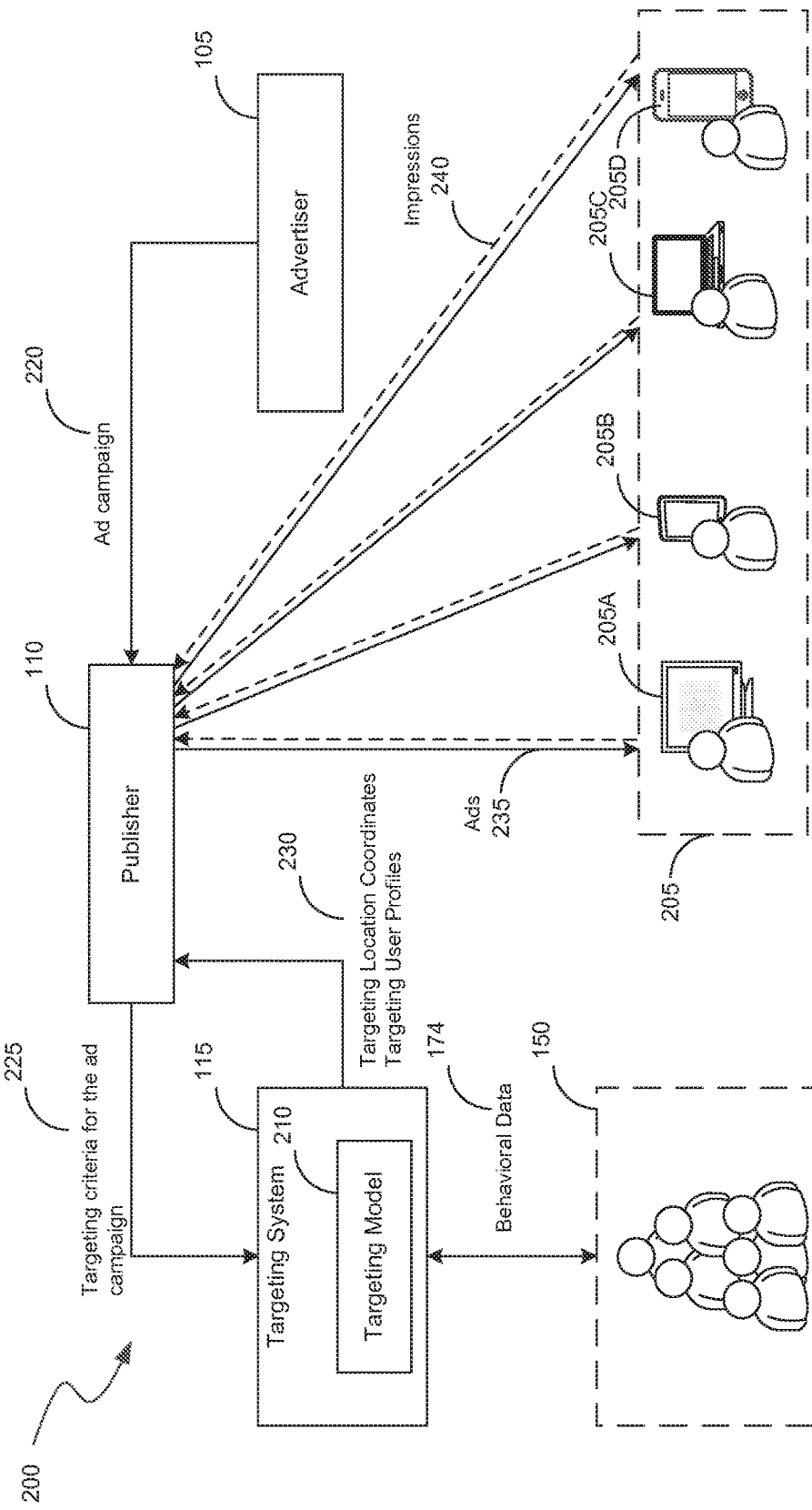
FIG. 2 is a block diagram illustrating an overview of running an advertisement campaign using targeting information provided by the targeting system.

FIG. 2 is a block diagram illustrating an overview of running an advertisement campaign using targeting information provided by the targeting system.

As illustrated in the diagram 200 an advertiser 105 can engage a publisher 110 to run an ad campaign 220. Generally, the ad campaign 120 can have one or more criteria that dictate how the ads are to be delivered (e.g., on web, mobile web, mobile applications), in what formats and whether the ads should be geo-targeted (e.g., country, region, metro area, city, postal code, latitude/longitude coordinates), for example. In accordance with the present disclosure the publisher 110 can provide one or more targeting criteria 225 for the ad campaign 120 to the targeting system 115. The targeting system 115 can collect behavioral data 174 collected from panelists 150 and extract geographic features from places and census data. The targeting system 115 can utilize a machine learning algorithm (e.g., based on a supervised learning model) to train a targeting model 210 using observed conversion rates determined rom a random sample of the behavioral data 174 and the geographic features of geographic units (e.g., cells) and use the trained targeting model 210 to predict conversion rates for geographic units. The conversion rates for geographic units can then be further processed and ranked to identify a portion of the location coordinates 230 with the highest conversion rates that can be used for targeting the ad campaign. In some embodiments, instead of or in addition to the location coordinates, user profiles or unique identifiers can be provided as targeting information to the publisher 110, including anonymous identifiers that lack any personally identifiable information ("PII"), e.g. where the publisher has access to only identifier.

The publisher 110 can then run the ad campaign 220 based on the targeting information. For example, the publisher can identify user devices 205A-D as being located at the targeting location coordinates 230 and can then send ads 235 to these user devices 205, and receive impressions 240 from the user devices 205. By way of another example, the publisher 110 can identify the users 205 as having user profiles matching the targeting user profiles 230 and can send ads to 235 to the user devices 205A-D of the users 205 (even though the publisher lacks any specific PII for each user).

Example Processing

Figure 3:
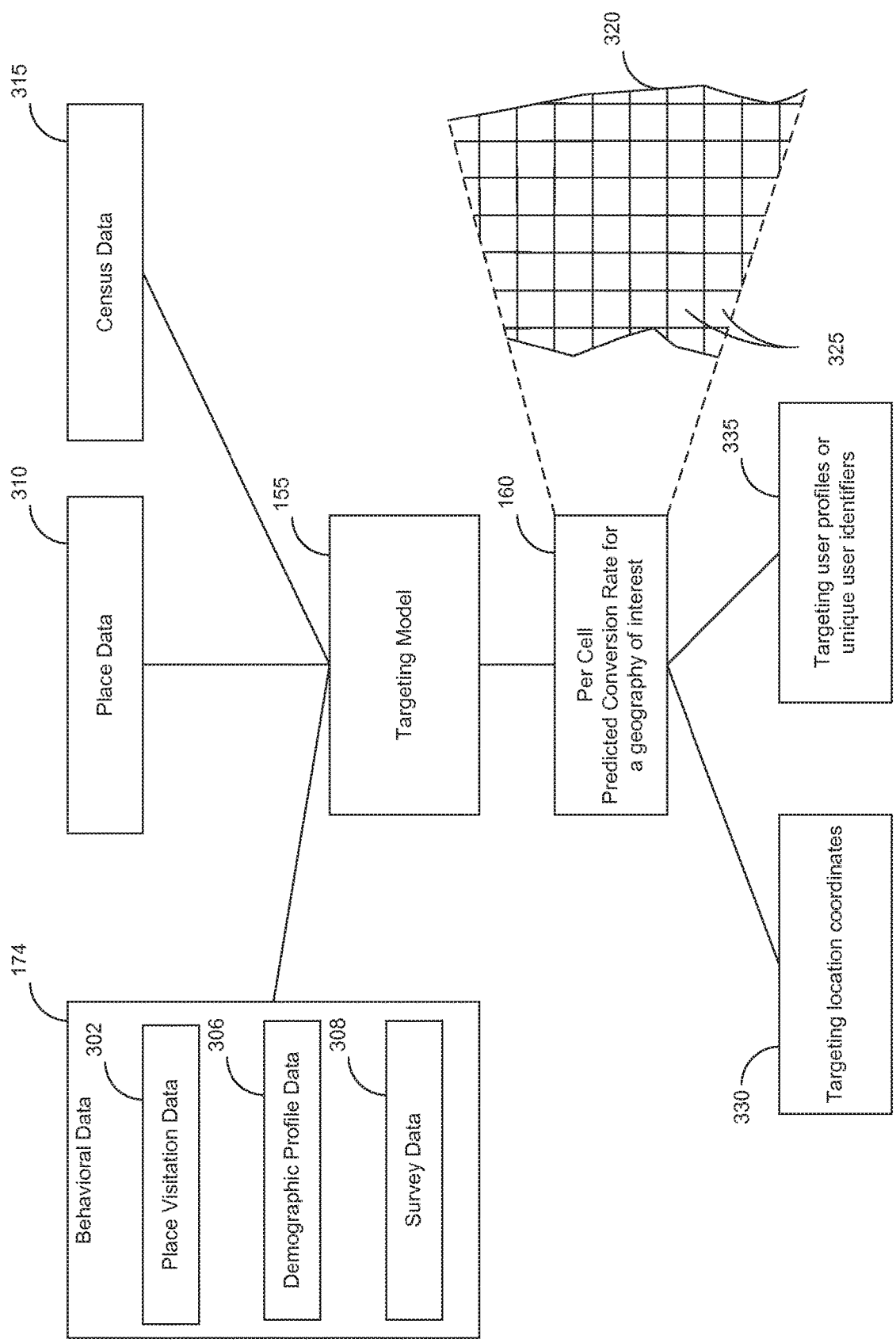
FIG. 3 is a block diagram illustrating generation of targeting information based on an analysis of behavioral data, place data and census data using a targeting model to predict a conversion rate of each cell in a grid on a geographic region.

FIG. 3 is a block diagram illustrating generation of targeting information based on an analysis of behavioral data, place data and census data using a targeting model to predict a conversion rate of each cell in a grid on a geographic region.

The targeting system 115 uses observed behavioral data 174 in determining targeting information. The observed behavioral data 174 can include place visit data 302 that links a user to a place at an instance of time. For example, place visit data 302 can indicate that a user visited a Walmart store in Shoreline, Wash. on Mar. 2, 2012 from 9 am-11:30 am. The observed behavioral data 174 can also include demographic profile data 306. For example, the demographic profile data 306 can indicate that the user is a male and his ethnicity is Hispanic. The observed behavioral data 174 can also include survey data 308 (e.g., how the user answered a specific survey question). The observed behavioral data 174 can be collected from the panelists of the targeting system 115 and can be organized and processed before being used as input data to the targeting model 155.

The targeting system 115 can also use place data 310 and census data 315. The place data 310 can include information about places (e.g., latitude/longitude coordinates of places, place names, business categories, and/or the like). The census data 315 can include but are not limited to: population density, proportion of population at various income buckets, proportion of married individuals, proportion of males at various age buckets, proportion of females at various age buckets, proportion of males at various education buckets, proportion of females at various education buckets, and/or the like. The targeting system 115 can extract features or distinct attributes from the place data 310 and/or census data 315 that can quantitatively describe each cell (e.g., cells 325) in a geographic region 320. Generally, a sample of users and their corresponding behavioral data and feature data are used in training the predictive targeting model 155, which when applied to the overall set of behavioral data 174 and the feature data, can output a predicted conversion rate 160 for each cell (e.g., cells 325) in the geographic region 320 as illustrated. The predicted conversion rate 160 for each cell can then be used to identify targeting location coordinates 330 and/or targeting user profiles or unique user identifiers 335.

Example Programming Modules

Figure 4:
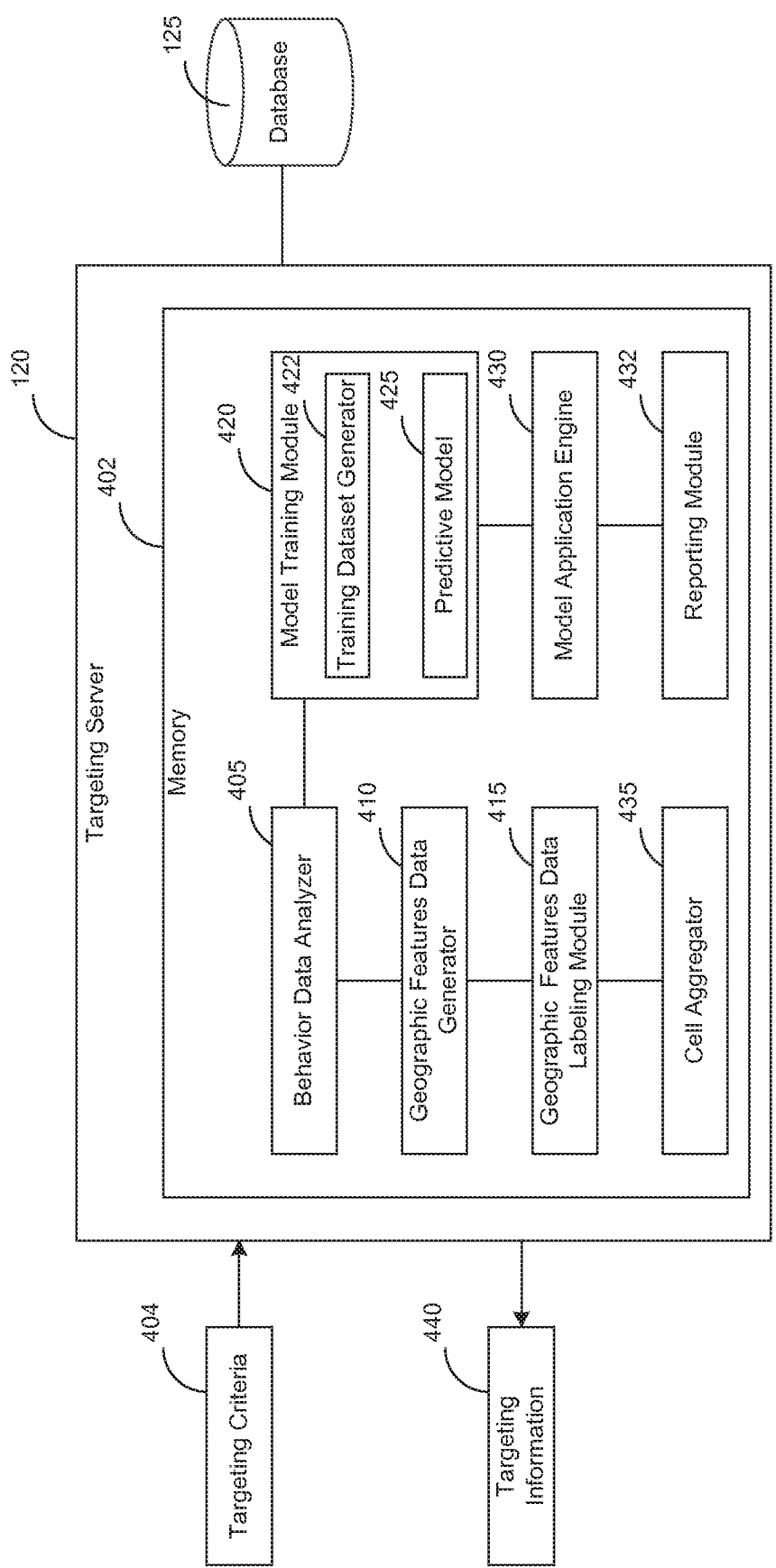
FIG. 4 is a block diagram illustrating example program modules of a targeting server of the targeting system.

FIG. 4 is a block diagram illustrating example modules of a targeting server 120 of the targeting system 115. In some embodiments, the targeting server 120 can include various computer-executable program modules stored in a memory 402. Examples of the program modules can include a behavior data analyzer 405, a geographic features data generator 410, a geographic features data labeling module 415, a model training module 420 that includes a training dataset generator 422 for building a predictive model 425, a model application engine 430, a reporting module 432 and/or a cell aggregator 435. The targeting server 120 can also include additional modules (e.g., communication modules, user interface modules and so on) that have not been described herein.

In some embodiments, the targeting server 120 receives one or more targeting criteria 404 from a client (e.g., a publisher, an advertiser) as input. Such targeting criteria can include a targeting behavior (e.g., target customers who go to Walmart), a demographic criterion (e.g., males), a geographic region of interest (e.g., a state, a country or any arbitrary geographic area), etc. The targeting server 120, via the geographic features data generator 410, can divide the geographic area of interest using a grid into cells (e.g., 250 m by 250 m square cell) and generate feature data for each cell. The feature data can include, for example, a total number of places, distances to nearby businesses of particular brands and distances to nearby categories of businesses, demographic features (e.g., percent of males, percent of females, percent of different ethnicities) and/or the like and can be stored in a database table in the database 125. While generally shown and described as using a two-dimensional grid, the system may also employ a three dimensional grid. Such a grid can be useful in dense urban locations, such as Hong Kong, where the system benefits from understanding which floor of a high-rise building a user visits, and the business on that floor being visited. In such an embodiment, the system uses not only latitude and longitude data, but also altitude data.

Figure 5:
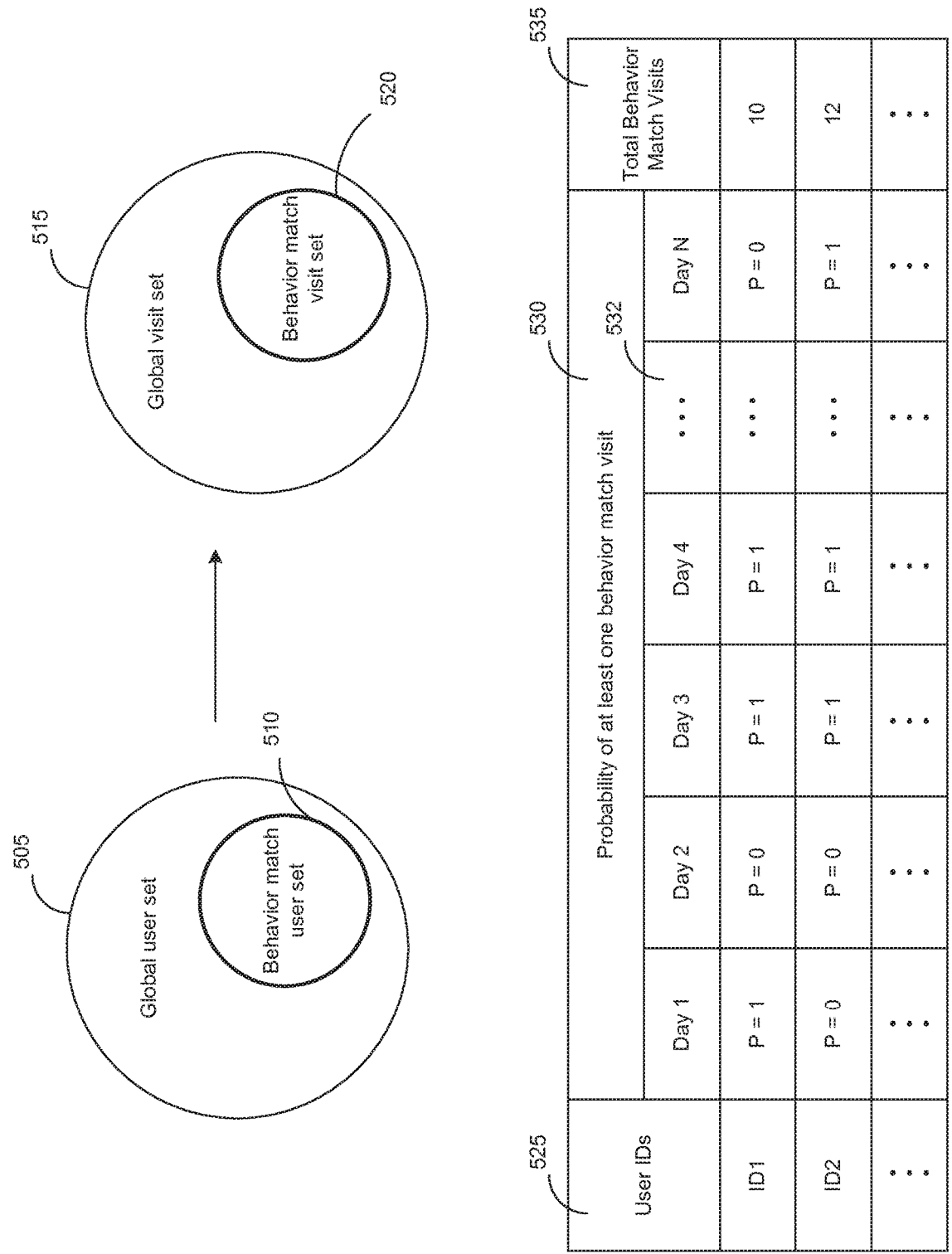
FIG. 5 is a block diagram illustrating an analysis of behavioral visitation data.

In addition to the feature data, targeting server 120 also considers observed behavioral data stored in a table in the database 125. The behavior data analyzer 405 can select a set of users for the targeting analysis. Normally, the set of users can include all the panelists of the targeting system. The panelists are users of the targeting system from whom geolocation data is collected. A data collection system can obtain user information, including location data, collected directly from the panelists. The data collection system obtains and validates location data from the panelists. The user information collected by the data collection system includes, for example, latitude, longitude, altitude determinations, sensor data (e.g., compass/bearing data, accelerometer or gyroscope measurements), user agent identifying information (e.g., device identifier, device name/model, operating system name/version), and other information that can be used to identify a panelist's location and activity. Additional details on the data collection system can be found in related application Ser. Nos. 13/405,182 and 13/405,190 both filed on Feb. 12, 2012 which are expressly incorporated by reference herein. In some embodiments, the set of users can include panelists matching one or more criteria. For example, the set of users can be users associated with a demographic feature or users who were asked a specific survey question. This set of users forms a global user set or group. The behavior data analyzer 405 then selects users who match a profile and/or a targeted behavior (e.g., answered a survey question a specific way) from the global user set to form a behavior matched user set. Referring to FIG. 5, the behavior match user set 510 is a subset of the global user set 505. The behavior data analyzer 405 can also identify all visits performed by the global user set as a global visit set and a subset of the global visit set that matches the targeted behavior (e.g., visiting a Walmart store) and performed by users in the behavior match visit set as a behavior match visit set. As illustrated in FIG. 5, the behavior match visit set 520 is a subset of the global visit set 515.

The geographic features data labeling module 415 utilizes information relating to the global visit set and the behavior matched visit set to determine a behavior match metric for each user in the behavior matched user set. The behavior match metric for a user defines a total number of days with each at least one behavior match visit by the user. As illustrated in FIG. 5, the behavior match metric can be calculated by grouping the behavior match visit set by user id 525 and by day 532. A probability of at least one behavior match visit 530 for each day is calculated and the number of days with a behavior match visit is summed to obtain the total behavior match visit metric 535. A value of the behavior match metric corresponding to a user from the behavior matched user set can then be assigned to a key formed by the tuple (cell id, user id) corresponding to all the visits to various places by the global user set. For example, if the value of a behavior match metric of user "A" is 10, then that value can get mapped on to each visit by user "A" in the following manner:

(1) user A visited "Walmart" in cell id "2"→key: (2, A)=10
(2) user A visited "Target" in cell id "1"→key (1, A)=10
(3) user A visited "Whole Foods" in cell id "5"→key (5, A)=10

The geographic features data labeling module 415 can then join the key-value pair obtained from the observed behavioral data with the geographic feature data (generated by the geographic features data generator 410) using the cell id to label the geographic features data with the behavior matched metric. The result is a labeled feature vector table, with the key: (cell id, user id, [feature vector]) and the value: behavior matched metric. This labeled feature vector table can be stored in a database table of the database 125. This has the effect of layering the observed behavioral information on to the cells so that all of the cells in which a user was observed get labeled with a prediction of the probability that the user will perform the targeted behavior.

The training dataset generator 422 of the model training module can generate a training data set for training a two-level predictive model 425 to predict a conversion rate for each cell, which is the probability that a random user observed in a cell will perform the targeted behavior. The training dataset generator 422 can take a random sampling of labeled feature vectors from the labeled feature vector table for the training. In some embodiments, prior to sampling, the training dataset generator 422 can perform a thresholding to exclude certain labeled feature vectors (e.g., labeled feature vectors with a place distance feature that exceeds 100 km) from the initial dataset.

At the first level, the model training module 420 can use the labeled feature data from the labeled feature vector table, including the observed behavior match metric, to train a model to predict a value of the observed behavior match metric which corresponds to a visit probability. At the second level, the system trains a statistical model (e.g., a linear regression model) using an observed conversion rate of a cell to predict a conversion rate of the cell for a given visit probability and in some embodiments, a geo-fence feature (e.g., the distance from Walmart or radius around Walmart). The model training module 420 can calculate the observed conversion rate as the average value of the behavior match metric over all users observed in a given cell in the training dataset. The statistical model can thus predict the average number of times the targeted behavior was performed by users observed in a given cell.

The model application engine 430 can apply the two-level predictive model 425 to a set of feature data (e.g., the full set of feature data) to generate a predicted conversion rate for the cell. The model application engine 430 can apply the first level of the model 425 to predict visit probabilities and the second level of the model 425 to predict the conversation rates. In some embodiments, the model application engine 430 can rank the cells based on conversion rates and select the top n number or x percent of cells as cells with high affinity for the targeted behavior. The reporting module 432 can then report locations (e.g., latitude and longitude coordinates) corresponding to the high affinity cells as targeting information 440. In some embodiments, instead of or in addition to the locations corresponding to the high affinity cells, one or more unique identifiers of users observed in these high affinity cells can be reported as targeting information 440. In some embodiments, the model application engine 430 can combine conversion rates with predictions of number of impressions served per cell (e.g., via another model) to generate a combined score. The cells can then be ranked based on the combined score and the top performing cell coordinates can be provided as targeting information 440. In some embodiments, the model training module 420 and the model application engine 430 can include or use only the first level and pass the predicted visit probabilities to the cell aggregator 435.

In some embodiments, the cell aggregator 435 can aggregate the predicted conversion rates to allow for a targeting area that is larger than a cell. The cell aggregator 435 can calculate an aggregate conversion rate of each cell by summing conversion rates of the cell and neighboring cells within a pre-defined distance from the cell. The cell aggregator 435 can retain only those cells with the highest aggregate conversion rates within a smaller radius. The reporting module 432 can then report locations corresponding to the retained cells as targeting information 440.

As described above, location data (e.g., 2-dimensional or 3-dimensional location data) can be used for indexing targeting predictions. In some embodiments, in addition to the location data, user agent identifying information, such as but not limited to operating system name/version, device name, model and/or identifier, and/or the like, can be used for indexing targeting predictions.

Figure 6A:
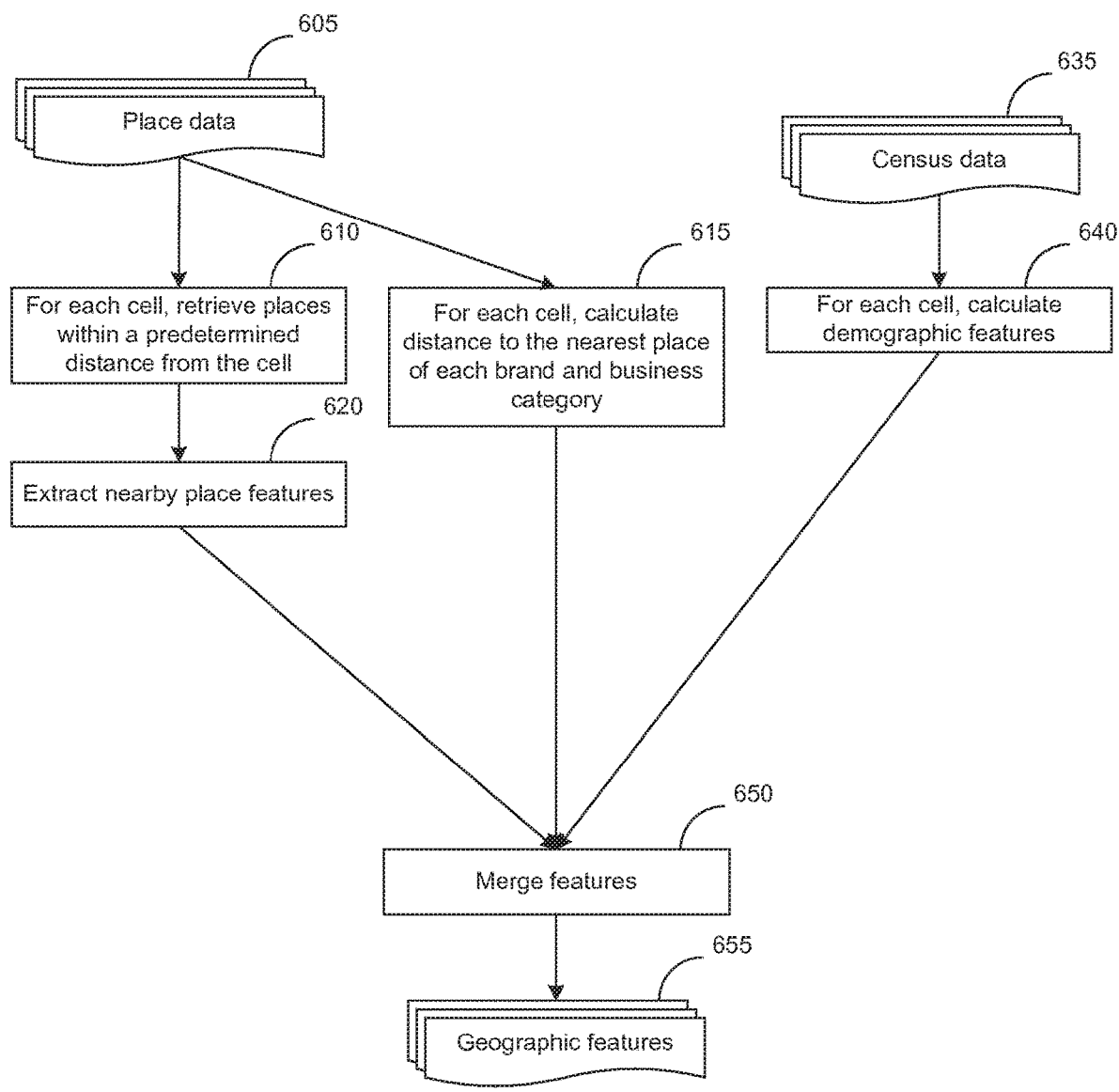
FIG. 6A is a logic flow diagram illustrating an example method of generating geographic features data by the targeting system.

FIG. 6A is a logic flow diagram illustrating an example method of generating geographic features data by the targeting system.

In some embodiments, the targeting system 115 generates a geographic feature set that includes a list of vectors of feature data from place data 605 and/or census data 635. The place data 605 and the census data 635 can be stored in the database 125. Each row in the geographic feature set can correspond to a cell (e.g., 0.005 degree×0.005 degree section on the map of the globe) and each column in a vector includes a feature extracted from the place data and/or the census data.

For each cell, the targeting system 115 can retrieve places that are within a predetermined distance from the cell (e.g., ~750 meters from the center of the cell) at block 610. The targeting system 115 can then extract nearby place features from the resulting data set at block 620. Examples of nearby features that can be extracted can include, but are not limited to:
1. Total number of places
2. Total number of places from each business category (e.g., the number of coffee shops within 750 meters of the cell)
3. Ratio of total number of places from each business category to total number of places ("category proportion")

At block 615, the targeting system can extract, for each cell, place distance features by calculating the distance to the nearest place of each brand and business category. This calculation can be an expensive process and some of the computational cost of performing this calculation can be reduced by using the following example methodology:
1. For each place, map or assign the place to all cells that are within 100 km of the place.
2a. For each of these cells, calculate the distance from the center of the cell to the place.
2b. Emit or generate a key-value pair. The key is the tuple (cell id, business id, category id) and the value is the calculated distance from 2a. The business id identifies a brand (e.g., McDonald's or Starbucks) and the category id identifies a type of business (e.g., a cafe or a grocery store).
3. For each (cell id, business id, category id) tuple, find the minimum distance from the cell (e.g., center of the cell) to the business id, and emit the key-value pair (cell id, (business id, category id, minimum distance)).
4. For each cell, calculate the following features:
    4a. Minimum distance to each business id
    4b. Minimum distance to each category id
For example, if there are three business ids (McDonald's, KFC and Walmart) associated with a cell id, after step 4, a following example row can be generated:
(cell id, mcdonalds_min_distance, Walmart_min_distance, kfc_min_distance, fast_food_min_distance, retail_min_distance)

At block 640, the targeting system 115 can retrieve census data 635 and calculate demographic features. The census data 635 can include, for example, a block group, census tract, county census tables and/or the like. Each census aggregation region can have its geographic shape associated with it. The targeting system 15 can calculate demographic features using the following example methodology:
1. For each census region, calculate a vector of features from the census table:
    1a. population density
    1b. proportion of population at various income buckets
    1c. proportion of married individuals
    1d. proportion of males at various age buckets
    1e. proportion of females at various age buckets
    af. proportion of males at various education buckets
    1g. proportion of females at various education buckets
2. For each cell inside each census region, generate a key-value pair. The key is the cell id. The value is the tuple (aggregation size, feature vector).
3. For each cell, find the feature vector associated with the smallest aggregation size and generate the key value pair (cell id, feature vector).

The nearby place features (from block 620), the place distance features (from block 615) and the demographic features (from block 640) are then merged together at block 650 to obtain a set of geographic features 655.

Figure 6B:
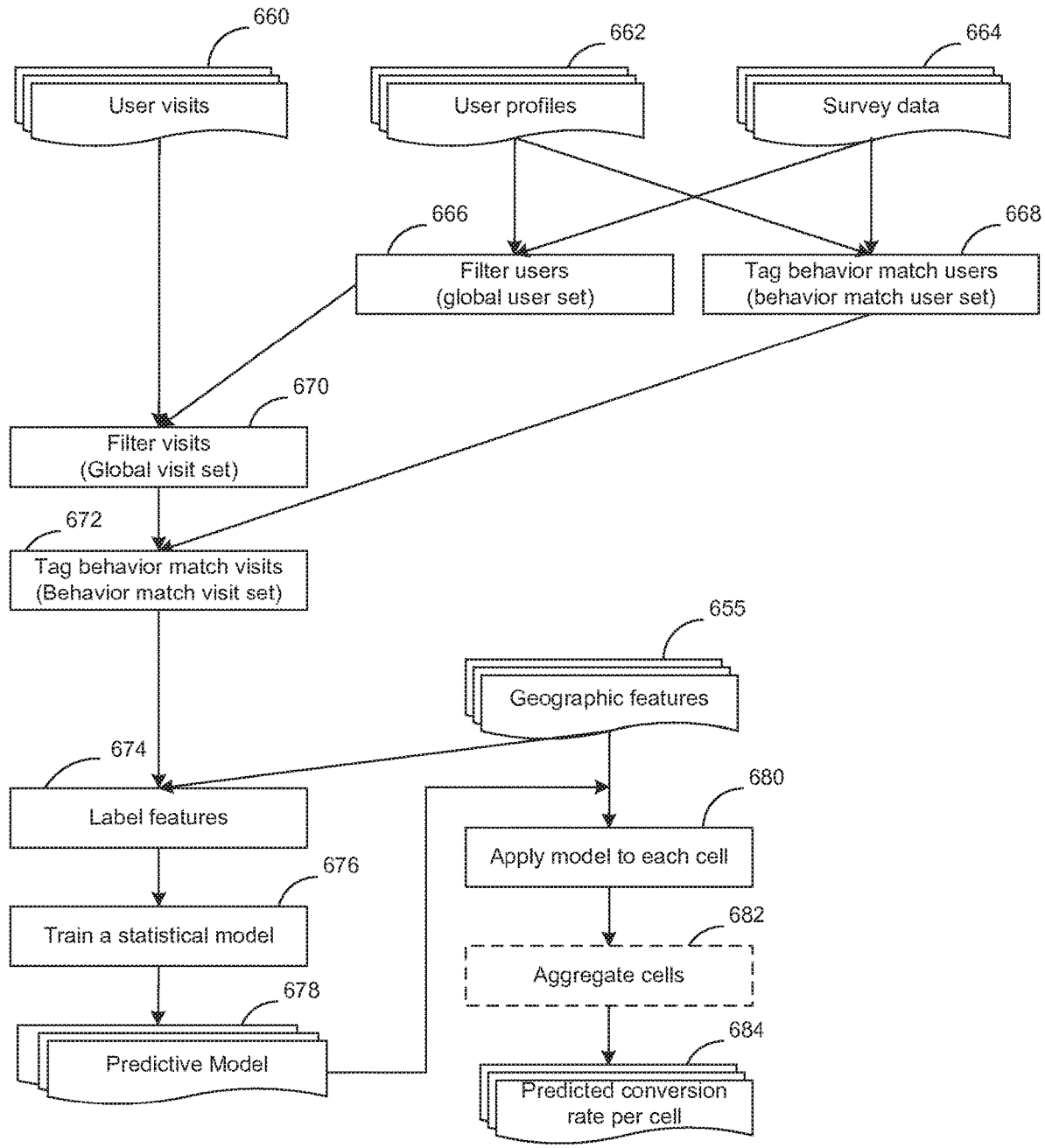
FIG. 6B is a logic flow diagram illustrating an example method of generating predicted conversion rate per cell by the targeting system.

FIG. 6B is a logic flow diagram illustrating an example method of generating predicted conversion rate per cell by the targeting system.

In some embodiments, the targeting system 115 receives user visits data 660, user profiles 662 and/or survey data 664. In some embodiments, the targeting system 115 can consider all the users of the targeting system for analysis. Alternatively, at block 666, the targeting system can filter users based on one or more criteria. The one or more criteria can include, for example, survey data 664 and/or user profile data 662 (e.g., users matching a demographic criterion). The set of users that match the filter criteria from the global user group or set.

At block 668, the targeting system 115 can tag users that match a targeted behavior. The tagged users then form the behavior matched user group or set. In this instance, the targeted behavior can be unrelated to store or place visits and may be related to, for example, survey data 664. For example if a user answered a specific survey question a specific way, then that user can be in the behavior matched user group. In some embodiments, if only place visit constraints are specified as a targeted behavior, then the functionality of block 668 is optional because the user group would be the same the global user group.

At block 670, the targeting system 115 filters the user visits data 660 using the global user group determined from block 666 to obtain a set of all visits performed by each user in the global user group ("global visit set"). At block 672, the targeting system 115 tags the visits in the global visit set that match a targeted behavior performed by each user in the behavior match user set. This subset of the global visit set is the behavior match visit set. For example, if the targeted behavior is visiting a Walmart, all visits with a high probability of being at Walmart can be part of the behavior match visit set.

At block 674, the targeting system 115 labels geographic features 655. The following example methodology can be used to label the geographic features 655.

1. Grouping the behavior match visit set by user and by day. For each day, calculate the probability of at least one behavior match visit. Sum this value across days to get a total number of days with a behavior match visit ("total behavior match visits").
2. For each visit in the global visit set, generate a key-value pair. The key can be the tuple (cell id, user id) and the value can be the user's total behavior match visits calculated in (1). If a user has no visits in the behavior match visit set, this value will be 0.
3. Join the key-value pairs in (2) with the geographic features 655 by cell id.

Each key-value pair is a row in a labeled feature vector table and the label is the total behavior match visits value.

At block 676, the targeting system 115 trains statistical models to obtain trained models 678. To train the statistical models, a training data set is first selected from a random sample of users and their corresponding behaviors and features. The sampled data set is then used for training the two-level statistical model to predict a conversion rate for each cell.

In the first level, based on the geographic feature data and the total behavior match visits (observed), a classifier (e.g., Random Forest Classifier) is used to predict whether the total behavior match visits is non-zero. This classification can be performed as a non-linear feature extraction step to combine the high-dimensional geographic feature vectors (e.g., a large number of features) into a single number, i.e., the visit probability, that is smaller than the original feature set but retains most of its characteristics.

In the second level, the visit probability and in some cases a geo-fence feature can be used to train a linear regression model to predict the conversion rate of a given cell. In some embodiments, the geo-fence feature can be a log-transformed distance to a target location. To train this regression model, the observed conversion rate is computed. In some embodiments, the observed conversion rate can be calculated as the average value of total behavior match visits over all users observed in a cell as seen in the sampled training data. The visit probability and geo-fence feature are then regressed on to these observed conversion rates.

In some embodiments, the targeting system 115 can apply the trained models 678 to each cell in the full geographic feature set at block 680 to generate a predicted conversion rate for each cell 684. This can be done by sequentially applying the first and second levels of the model to obtain the predicted visit probabilities and conversion rates, respectively.

In some embodiments, the targeting system 115 can aggregate cells at block 682. Aggregating the cells can include aggregating the predicted conversion rates to allow for larger targeting radii. In some embodiments, the targeting system 115 can calculate the aggregated conversion rate at each cell by considering every cell within a specified distance (e.g., number of meters). The targeted system can then retain cells with the highest aggregated conversion rate or score within a smaller radius.

Figure 7:
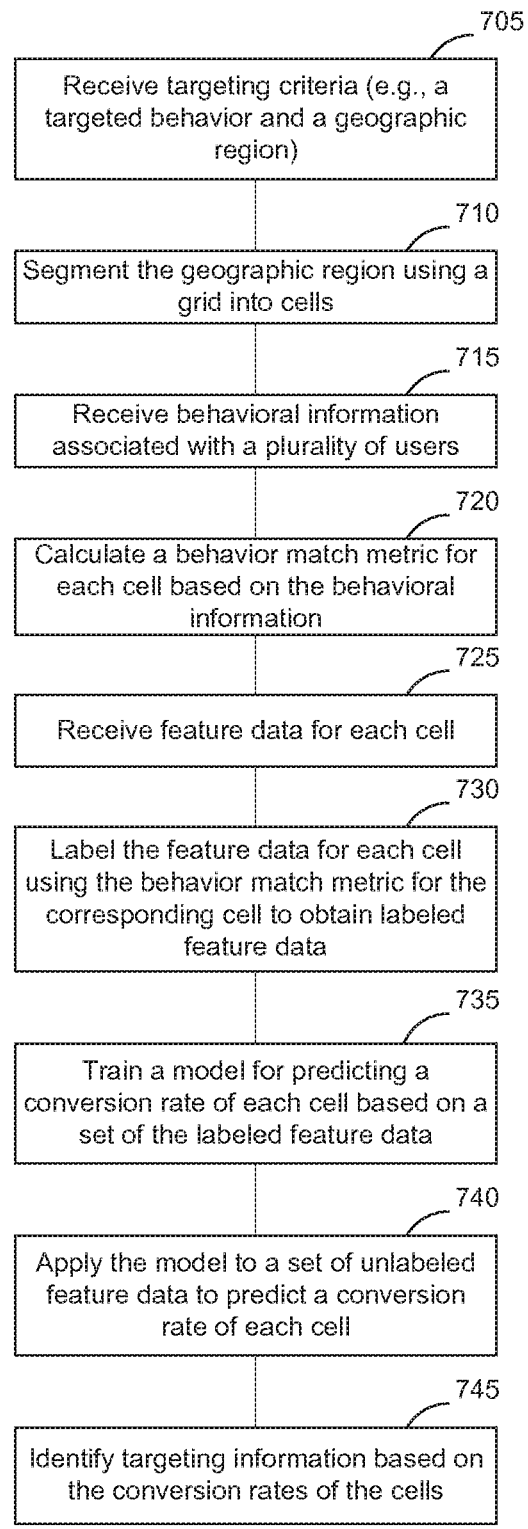
FIG. 7 is a logic flow diagram illustrating an example method of identifying targeting information based on targeting criteria.

FIG. 7 is a logic flow diagram illustrating an example method of identifying targeting information based on targeting criteria.

As illustrated, at block 705, the targeting system receives targeting criteria. In some embodiments, the targeting criteria can include a targeted behavior and a geographic region. The targeting criteria can be received from an advertiser, a publisher or any other entity that desires to identify people and/or places that have a high propensity to perform the targeted behavior. The targeted behavior can be any behavior of interest, for example, visiting a store or signing up for an event. In some embodiments, the targeting criteria can also include information about demographic profiles and/or survey data. For example, an advertiser may be interested in knowing where women in the age group 40-50 that have a high affinity for gyms may be located. The targeting system 115 can then consider the age group and gender of the panelists along with visits to gyms to predict those locations. The geographic region can be any region of interest (e.g., the USA, Washington, North West).

At block 710, the targeting system 115 can segment the geographic region using a grid into cells. Each cell has a cell identifier. At block 715, the targeting system 115 can receive or retrieve behavioral information associated with users. The behavioral information can include time-stamped place visit data corresponding to places visited by the users. At block 720, the targeting system 115 can calculate a behavior match metric for each cell based on the behavioral information. At block 725, the targeting system 115 can receive or retrieve feature data for each cell. The feature data can be generated using a separate process. The targeting system 116 can label the feature data for each cell using the corresponding behavior match metric to obtain labeled feature data at block 730. A set of the labeled feature data can then be used by the targeting system 115 at block 735 to train a model for predicting a conversion rate for each cell. At block 740, after the model has been trained, a set of the feature data (e.g., the unlabeled feature data) can be analyzed by the trained model to predict a conversion rate of each cell. At block 745, the targeting system 115 can identify targeting information based on the conversion rates of the cells. The targeting information can be in the form of people (e.g., unique identifiers or profile characteristics of users in cells with high conversion rates), places (e.g., location coordinates of cells with high conversion rates) or both in various embodiments.

Figure 8:
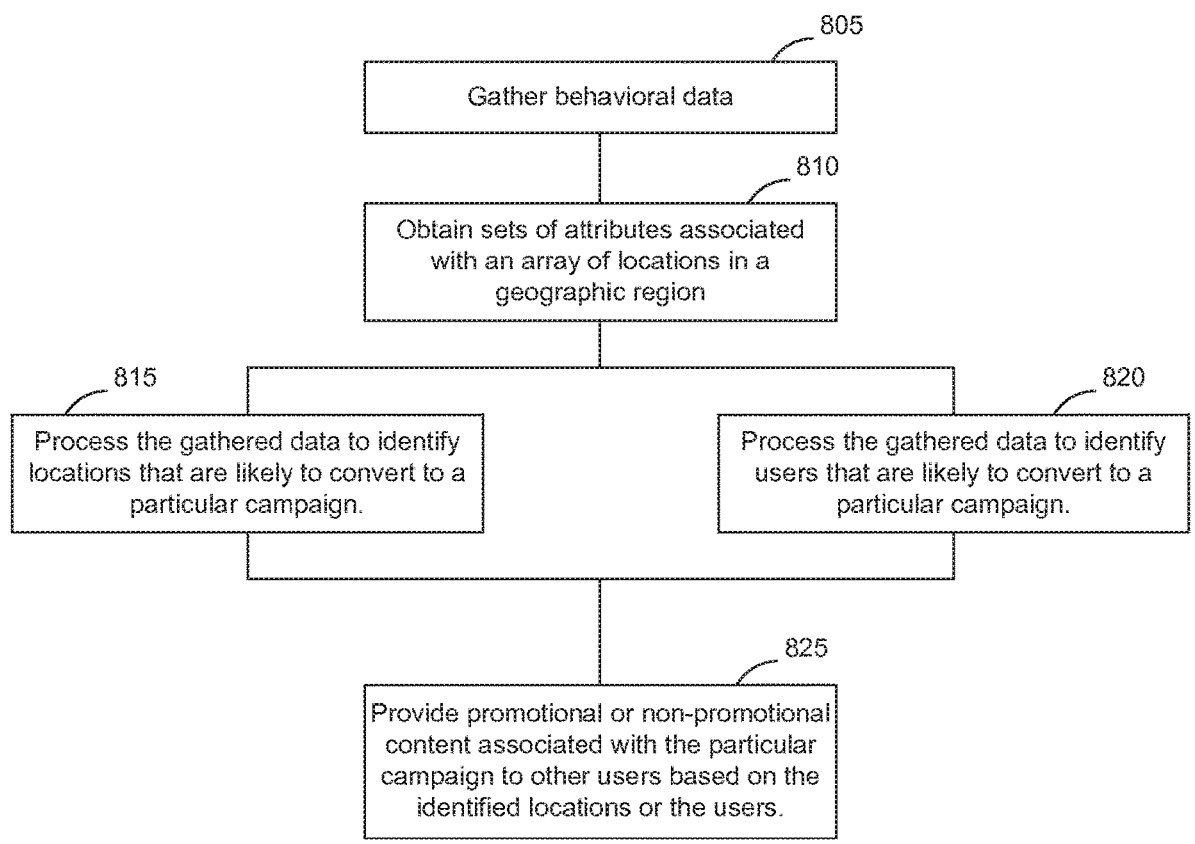
FIG. 8 is a logic flow diagram illustrating an example method of identifying locations or users that are likely to convert, based on a particular campaign.

FIG. 8 is a logic flow diagram illustrating an example method of identifying locations or users that are likely to convert, based on a particular campaign.

The targeting system 115, in some embodiments, gathers, receives or retrieves behavioral data at block 805. At block 810, the targeting system 115 receives, gathers or retrieves sets of attributes associated with an array of locations in a geographic region. Each set of attribute can be a high dimensional data (e.g., 2000 or more attributes or features). The targeting system 115 can process the gathered data to identify at least one of locations (block 815) or users (820) that are likely to convert, based on a particular campaign. In some embodiments, both locations and users can be identified and each, alone or in combination, can be used to target promotional content or non-promotional content associated with the particular campaign (or similar campaign) to other users at block 825.

Figure 9:
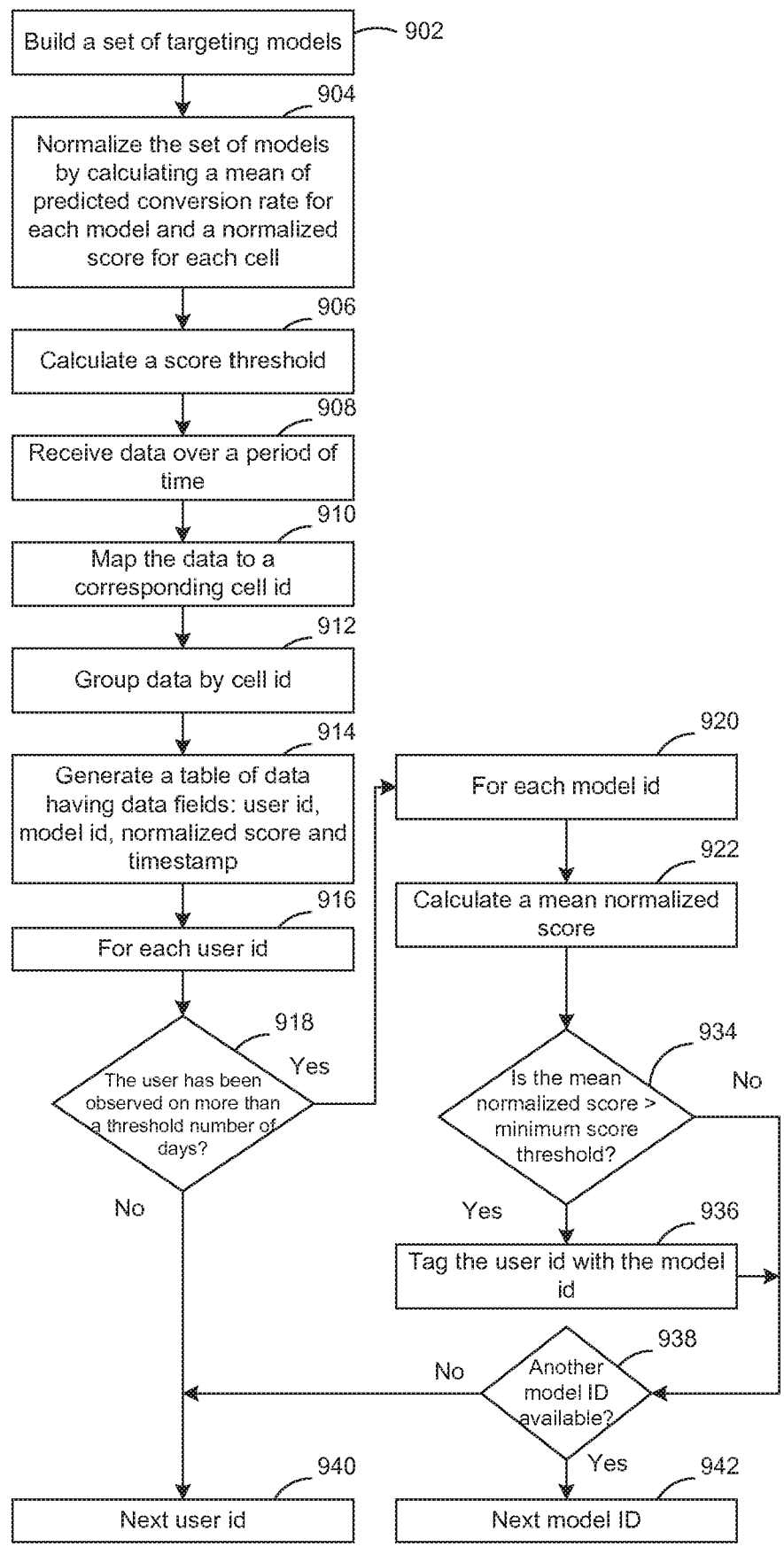
FIG. 9 is a logic flow diagram illustrating an example method of identifying a set of users associated with a targeted behavior.

In some embodiments, the targeting system 115 can identify a set of users associated with a targeted behavior and/or a targeting model using an example method illustrated in FIG. 9.

Referring to FIG. 9, the targeting system 115 can build a set of targeting models (e.g. one for each of the top 30 businesses and 20 categories) at block 902. At block 904, the targeting system 115 can normalize the set of targeting models. In some embodiments, normalizing can include calculating a mean (or another statistical measure) of predicted conversion rates for each model and using the mean to calculate, for each cell, a normalized score. The normalized score, in some embodiments, can be calculated as a ratio of a conversion rate of the cell and the mean conversion rate. At block 906, the targeting system 115 can calculate a score threshold. The score threshold, in some embodiments, can be calculated by determining the N.sup.th percentile (e.g., 95.sup.th, 98.sup.th) normalized score across the full set of models. At block 908, the targeting system can receive or gather data over a period of time (e.g., 1 week, 1 month). The gathered data can include, for example, a user identifier, a coordinate, and a timestamp. The gathered data can be mapped to corresponding cell ids based on the coordinates at block 910. At block 912, the targeting system 115 can group the data by cell id and generate a table of data at block 914. The process for generating the table of data can include, determining, for each cell id, and for each of the normalized models (each having a model id) associated with the cell id, a normalized score for the model id and generating a user id, model id, a normalized score and a timestamp. For each user id 916 in the table of data, the targeting system 115 can determine if the user has been observed on more than a threshold number of days at decision block 918. If false, the targeting system 115 evaluates the next user id at block 940. If true, the targeting system 115 can calculate, for each model id 920 associated with the user id, a mean normalized score at block 922. At decision block 934, the targeting system 115 can if the mean normalized score is greater than the score threshold (from block 906). If true, the targeting system 115 can tag the user id with the model id at block 936. If another model id is associated with the user id as determined at decision block 938, targeting system 115 can repeat the process with the next model id 942, otherwise the next user id 940, if available, can be evaluated. In some embodiments, user profiles or unique identifiers associated with the identified user ids that are tagged with a particular model id can be provided as targeting information to a publisher associated with the model id.

CONCLUSION

The above Detailed Description of embodiments of the targeting system 115 is not intended to be exhaustive or to limit the embodiments to the precise form disclosed above. While specific examples for the embodiments are described above for illustrative purposes, various equivalent modifications are possible within the scope of the embodiments, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative combinations or subcombinations. Each of these processes or blocks may be implemented in a variety of different ways. Also, while processes or blocks are at times shown as being performed in series, these processes or blocks may instead be performed or implemented in parallel, or may be performed at different times.

In general, the terms used in the following claims should not be construed to limit the embodiments to the specific examples disclosed in the specification, unless the above Detailed Description section explicitly defines such terms. Accordingly, the actual scope of the embodiments encompasses not only the disclosed examples, but also all equivalent ways of practicing or implementing the embodiments under the claims.

We claim:

1. A method for use by at least one data processing device, the method comprising:
   receiving targeting criteria, including a targeted behavior and a geographic region;
   segmenting the geographic region using a grid into cells, wherein each cell has a cell identifier;
   receiving behavioral information associated with multiple users, wherein the behavioral information includes time-stamped place visit data corresponding to visits to places by the multiple users;
   calculating a behavior match metric for one or more cells based on the behavioral information;
   receiving feature data for one or more cells;
   labeling the feature data for the one or more cells using the behavior match metric for the corresponding cell to obtain labeled feature data;
   training a model for predicting a conversion rate of each cell based on a set of the labeled feature data, wherein the conversion rate provides a probability of a user in a cell performing the targeted behavior;
   applying the model to the feature data to predict the conversion rate of each cell; and
   presenting targeting information based on the conversion rates of the cells to a client device.

2. The method of claim 1, wherein the targeting information comprises latitude/longitude coordinates of locations having one of:
   greater than or equal to a specified conversion rate; or
   users identified as likely engage in targeted behavior.

3. The method of claim 1, wherein the behavioral information is projected onto the one or more cells.

4. The method of claim 1, wherein the behavioral information comprises one of survey data or demographic profile data associated with users.

5. The method of claim 1, wherein training the model comprises:
   training a classifier using the set of labeled feature data to predict a visit probability that provides an indication of a likelihood that the user in the cell would perform the targeted behavior; and
   training a statistical model using the visit probability.

6. The method of claim 5, wherein training the statistical model further comprises training the statistical model using an observed conversion rate aggregated across a plurality of user in the cell to predict the conversion rate for the cell.

7. The method of 6, wherein applying the model comprises:
   applying the classifier on the feature data to predict a visit probability; and
   applying the statistical model on the visit probability to predict the conversion rate.

8. The method of claim 1, wherein the targeted behavior comprises on or more of:
   visiting a place;
   signing up for an event; or
   performing an activity.

9. A non-transitory computer-readable medium storing computer-executable instructions that, when executed by at least one processor, perform a method comprising:
    receiving targeting criteria, including a targeted behavior and a geographic region; segmenting the geographic region using a grid into cells, wherein each cell has a cell identifier;
    receiving behavioral information associated with multiple users, wherein the behavioral information includes time-stamped place visit data corresponding to visits to places by the multiple users;
    calculating a behavior match metric for one or more cells based on the behavioral information;
    receiving feature data for one or more cells;
    labeling the feature data for the one or more cells using the behavior match metric for the corresponding cell to obtain labeled feature data;
    training a model for predicting a conversion rate of each cell based on a set of the labeled feature data, wherein the conversion rate provides a probability of a user in a cell performing the targeted behavior;
    applying the model to the feature data to predict the conversion rate of each cell; and
    presenting identifying targeting information based on the conversion rates of the cells to a client device.

10. The non-transitory computer-readable medium of claim 9, wherein the targeted behavior comprises on or more of:
    visiting a place;
    signing up for an event; or
    performing an activity.

11. The non-transitory computer-readable medium of claim 9, wherein the targeting information comprises latitude/longitude coordinates of locations having one of:
    greater than or equal to a specified conversion rate; or
    users identified as likely engage in targeted behavior.

12. The non-transitory computer-readable medium of claim 9, wherein the behavioral information is projected onto the one or more cells.

13. The non-transitory computer-readable medium of claim 9, wherein the behavioral information comprises one of survey data or demographic profile data associated with users.

14. The non-transitory computer-readable medium of claim 9, wherein training the model comprises:
    training a classifier using the set of labeled feature data to predict a visit probability that provides an indication of a likelihood that the user in the cell would perform the targeted behavior; and
    training a statistical model using the visit probability.

15. The non-transitory computer-readable medium of claim 14, wherein training the statistical model further comprises training the statistical model using an observed conversion rate aggregated across a plurality of user in the cell to predict the conversion rate for the cell.

16. A system comprising:
    at least one processor; and
    memory encoding computer-executable instructions that, when executed by the at least one processor, perform a method comprising:
    receiving targeting criteria, including a targeted behavior and a geographic region; segmenting the geographic region using a grid into cells, wherein each cell has a cell identifier;
    receiving behavioral information associated with multiple users, wherein the behavioral information includes time-stamped place visit data corresponding to visits to places by the multiple users;
    calculating a behavior match metric for one or more cells based on the behavioral information;
    receiving feature data for one or more cells;
    labeling the feature data for the one or more cells using the behavior match metric for the corresponding cell to obtain labeled feature data;
    training a model for predicting a conversion rate of each cell based on a set of the labeled feature data, wherein the conversion rate provides a probability of a user in a cell performing the targeted behavior;
    applying the model to the feature data to predict the conversion rate of each cell; and
    presenting identifying targeting information based on the conversion rates of the cells to a client device.

17. The system of claim 16, wherein training the model comprises:
    training a classifier using the set of labeled feature data to predict a visit probability that provides an indication of a likelihood that the user in the cell would perform the targeted behavior; and
    training a statistical model using the visit probability.

18. The system of claim 17, wherein training the statistical model further comprises training the statistical model using an observed conversion rate aggregated across a plurality of user in the cell to predict the conversion rate for the cell.

19. The system of 18, wherein applying the model comprises:
    applying the classifier on the feature data to predict a visit probability; and
    applying the statistical model on the visit probability to predict the conversion rate.

20. The system of claim 16, wherein the targeted behavior comprises on or more of:
    visiting a place;
    signing up for an event; or
    performing an activity.

\* \* \* \* \*